United States Patent [19]

Pueschner et al.

[11] 4,159,778

[45] Jul. 3, 1979

[54] STRADDLE CARRIERS FOR CONTAINERS

[75] Inventors: Philip Pueschner, Wausau; William K. Holmes; Duane L. Thiele, both of Schofield; Richard A. Stearn, Sturgeon Bay; Norbert W. Lenius, Sturgeon Bay; Lynn L. Keller, Sturgeon Bay, all of Wis.

[73] Assignee: J. I. Case Company, Racine, Wis.

[21] Appl. No.: 876,170

[22] Filed: Feb. 8, 1978

Related U.S. Application Data

[63] Continuation of Ser. No. 729,402, Oct. 4, 1976, abandoned.

[51] Int. Cl.2 .......... B60P 3/00

[52] U.S. Cl. .......... 414/460; 91/452; 91/461; 180/133; 417/426

[58] Field of Search .......... 214/392, 394, 396, 390; 180/14 R, 14 A, 139, 133; 91/461, 452, 468; 417/426, 428, 319

[56] References Cited

U.S. PATENT DOCUMENTS

| | | | |
|---|---|---|---|
| 3,520,431 | 7/1970 | Tax | 214/394 |
| 3,655,081 | 4/1972 | Monk | 214/394 |

*Primary Examiner*—Albert J. Makay
*Attorney, Agent, or Firm*—Dressler, Goldsmith, Clement, Gordon & Shore

[57] ABSTRACT

A straddle carrier consisting of an inverted U-shaped frame, having a pair of vertically extending legs that define an elongated container carrying bay with each leg supported by a plurality of wheels is disclosed herein. First and second engines are respectively supported on the legs and each engine drives a plurality of pumps which supply pressurized fluid for driving and steering the vehicle, as well as pumps for supplying fluid to a plurality of other functions. The hydraulic circuit for performing the plurality of other functions as well as the steering function is designed so that all of the functions may be operated from the pumps driven by one of the engines in case of power failure in the other engine.

2 Claims, 15 Drawing Figures

LATCHING CYLINDER(S)
SPREADER TRAVERSE CYLINDERS

STRADDLE CARRIERS FOR CONTAINERS

This is a continuation, of application Ser. No. 729,402, filed Oct. 4, 1976, now abandoned.

BACKGROUND OF THE INVENTION

With the advent of large vans in container handling systems, sometimes referred to as "containerization" in the industry, a need has been developed for specialized vehicles that are adapted to efficiently handle and transport such containers, particularly in transport facilities, such as railroad yards and docks. In order to "standardize" the container industry, containers are usually either 20 or 40 feet in length and have specially adapted brackets at the corners thereof, which are adapted to receive latches to support the containers during transportation. The vehicles that have been utilized for such transportation generally consist of an inverted U-shaped frame that has wheels on the lower ends of the respective legs and the legs define an elongated open bay with a spreader unit supported in the open bay of the vehicle. The spreader normally has latches at the respective corners thereof for connection to a container and the spreader is capable of being elevated through some type of hoisting means.

Most of the prior art units of this type are primarily designed for hoisting and lowering containers, particularly in railroad yards where the units are used for placing containers onto a flatbed or a railroad car. These units generally are operated at very low speeds and normally have a maximum speed of 5 MPH.

SUMMARY OF THE INVENTION

The straddle carrier of the present invention, is a highly maneuverable unit which is capable of being operated at speeds of up to 20 MPH, while carrying a fully loaded container, which may weigh substantially more than 50,000 pounds.

The unique straddle carrier consists of a generally inverted U-shaped frame, having two transversely spaced vertical legs interconnected at their upper ends by a horizontal frame portion with the vertical legs respectively supported on a plurality of wheels. Each of the legs has a separate engine supported thereon and each engine drives a plurality of pumps. The first pump, driven by each engine, is connected to drive motors that are associated with at least one of the wheels on the associated leg of the frame. Each engine drives at least a further pair of pumps which are utilized for performing a plurality of control functions associated with the straddle carrier.

More specifically, the direction of the vehicle is controlled through a hydraulic power steering system for turning all of the wheels and hydraulic fluid is supplied to the power steering system from one pump of the pair of pumps on the first leg of the vehicle. A spreader is supported for vertical movement in the bay by a plurality of hoisting fluid rams and the spreader has a plurality of additional fluid rams for performing a plurality of control functions to connect a container thereto. The additional fluid rams have hydraulic fluid supplied thereto from one pump of the pair of pumps on the second leg of the U-shaped frame while hydraulic fluid is supplied to the hoisting fluid rams from the remaining pumps that are driven by the respective engines.

According to the primary aspect of the present invention, the hydraulic circuit incorporates interconnection means which is capable of selectively connecting both the power steering system and the plurality of additional fluid rams to one pump driven by one engine so that all of the functions are capable of being performed by a single engine. The interconnection means incorporates a plurality of quick-disconnect couplings which can readily be disconnected and connected to other coupling elements so that either first pump of the first and second pairs of pumps, driven by the respective engines, can be connected in series with both the power steering system as well as the plurality of additional fluid rams, to have a single pump providing hydraulic fluid to both systems.

In the specific embodiment illustrated, the hoisting fluid rams include a first fluid ram on the first leg of the vehicle with the first fluid ram having one end operatively connected to one end of the spreader and pressurized fluid is supplied thereto from one of the first pair of pumps. A second fluid ram is supported on the second leg and is operatively connected to the opposite end of the spreader with the second fluid ram having fluid supplied thereto from one of the second pair of pumps.

The interconnecting means includes means for connecting both of the fluid rams to one of the pumps so that both fluid rams can be actuated from a pump driven by one of the engines.

The respective hoisting fluid rams are connected to the respective ends of the spreader through a hoisting chain assembly that includes three elongated flexible members associated with each fluid ram and extending parallel to each other. One end of each of the flexible members is connected to the frame adjacent the associated fluid ram and each of the flexible members extends over a first pulley that is supported on a free end of an extensible element that forms part of the hoisting fluid ram. The respective flexible members are then entrained over a first idler pulley that is located above one of the corners of the frame at the upper end thereof. The two outermost flexible members are then entrained over a second pulley that is generally in vertical alignment with one corner of the spreader and both of the flexible members are connected to that corner of the spreader. The remaining or intermediate flexible member is entrained over an additional pulley that is supported on the frame and is generally vertically aligned with an opposite adjacent corner of the spreader with the intermediate flexible members attached to the adjacent corner of the spreader. Therefore, a single fluid ram is capable of raising and lowering one end of the spreader and the load on the end of the fluid ram will always be centered regardless of the uneven loading of the respective corners of the spreader. This necessarily results from the fact that the center intermediate flexible member extends across the centers of the respective pulleys, particularly the pulley at the free end of the fluid ram, while the two flexible members connected to an opposite corner are equally spaced from the center of the pulley on the fluid ram. The second fluid ram is connected to the remaining corners of the spreader through the three flexible members as described above.

According to one further aspect of the invention, the hydraulic circuit for supplying fluid to the respective hoisting fluid rams or cylinder and piston rod assemblies, incorporates an anti-tilt circuit that prevents the spreader from being tilted beyond a predetermined maximum angle with respect to a horizontal reference plane. The hydraulic circuit for supplying fluid to the hoisting fluid rams includes a reservoir, a pressurized fluid source with first and second electrically operated valves, each connected to the reservoir and pressurized fluid source and respectively connected to opposite ends of the cylinders of the respective hoisting fluid rams. An electric circuit supplies current through separate circuits to the respective electrically operated valves so that the valve spools thereof are moved in proportion to the current flow in either direction. The electric circuit includes a manual control in the respective circuits so that either or both valves can be actuated to raise or lower either end of the spreader or simultaneously raise or lower both ends of the spreaders.

The electric circuit also includes attitude control circuit means consisting of first and second relay means, each having a pair of normally closed sets of contacts in the respective circuits leading to the respective electrically operated valves. A pendulum control member is supported for free movement on the spreader and actuates one of the two relays when the spreader reaches a maximum attitude with respect to a horizontal reference plane. Thus, when a spreader reaches a maximum attitude with respect to a reference plane, the electric circuits to the respective control valves are opened to prevent any further tilting of the spreader.

The electric circuit also incorporates bypass switch means that are in parallel with each of the sets of contacts and are responsive to reverse polarity in the respective circuits to the control valves so that the spreader can be tilted towards the reference plane through current flow through the bypass switch means.

The spreader is supported on a pair of transversely extending beams that are guided for vertical movement at opposite ends on the respective vertical legs of the inverted U-shaped frame and the spreader is capable of being shifted transversely on the beams through two fluid rams that are included in the plurality of fluid rams that perform the control functions to connect the container to the spreader. The circuit means for supplying hydraulic fluid to the side shift fluid rams for the spreader, also incorporate centering means for automatically centering the spreader between the respective legs in response to actuation of the centering means.

The straddle carrier, in its specific embodiment, is supported by four wheels on the lower end of each of the two legs of the inverted U-shaped frame. All of the wheels are controlled by a single-power steering system that includes a single power steering pump and steering wheel for supplying fluid to a plurality of fluid rams located in the steering linkage between the respective wheels on each side of the vehicle. Also the respective wheels on each side of the vehicle are interconnected through a linkage so that all of the wheels are turned in synchronized relation with fluid supplied from the power steering pump to the respective fluid rams.

BRIEF DESCRIPTION OF SEVERAL VIEWS OF DRAWINGS

Figures 8, 8A, 8B, 8C, 8D:
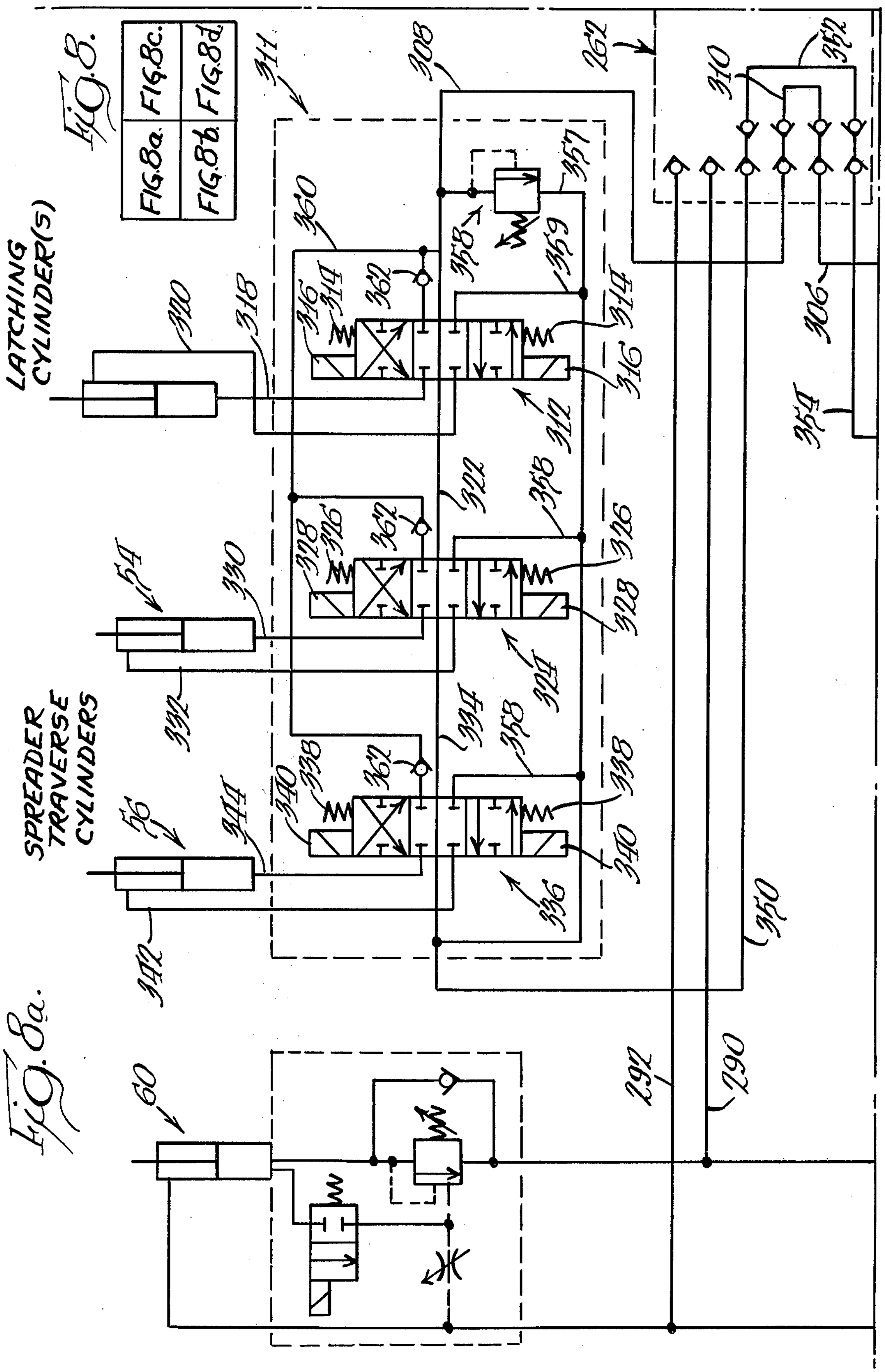
FIG. 8 is a block diagram showing the arrangement of FIGS. 8a thru 8d.
Figure 8B:
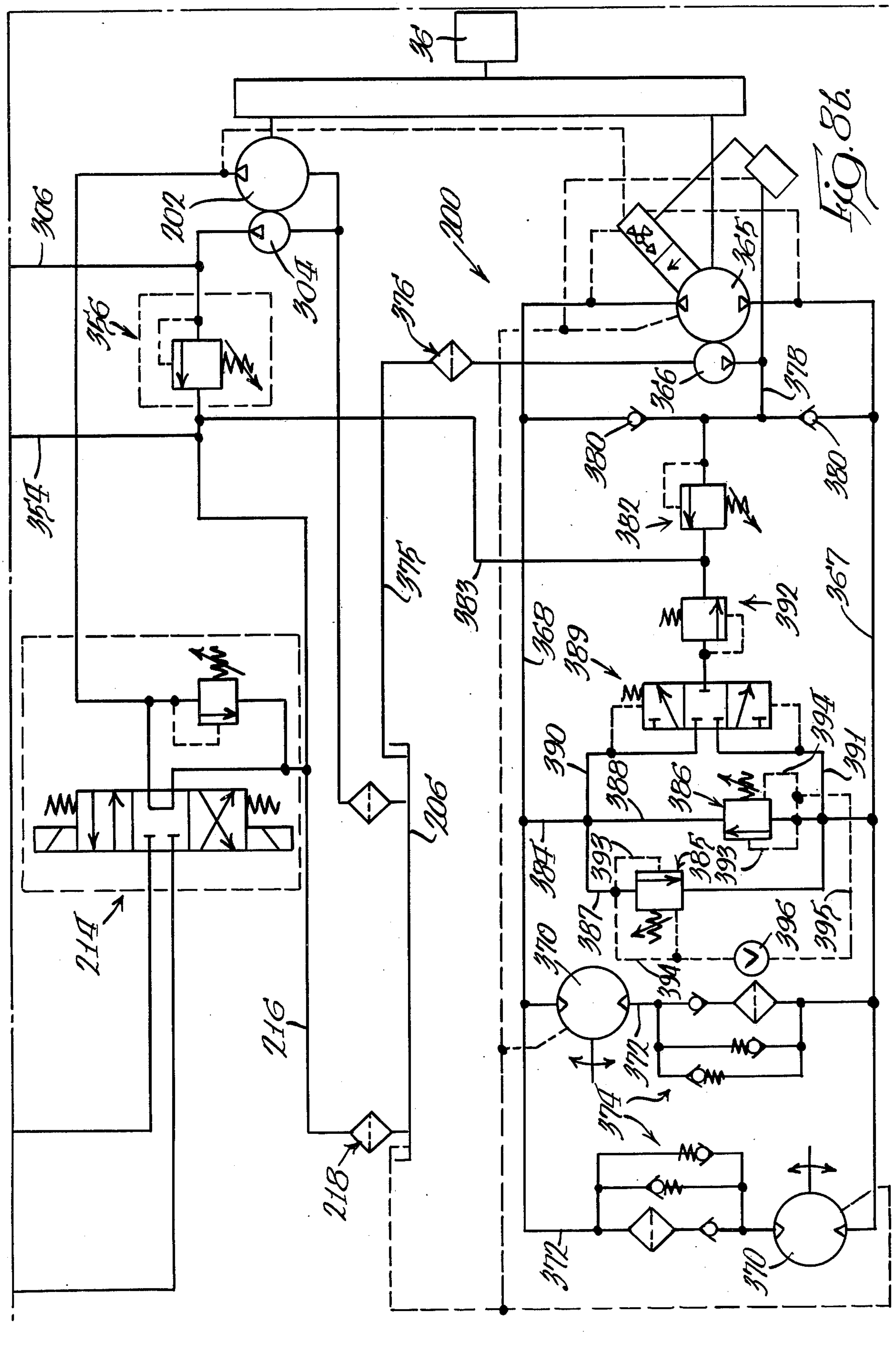
Figure 8C:
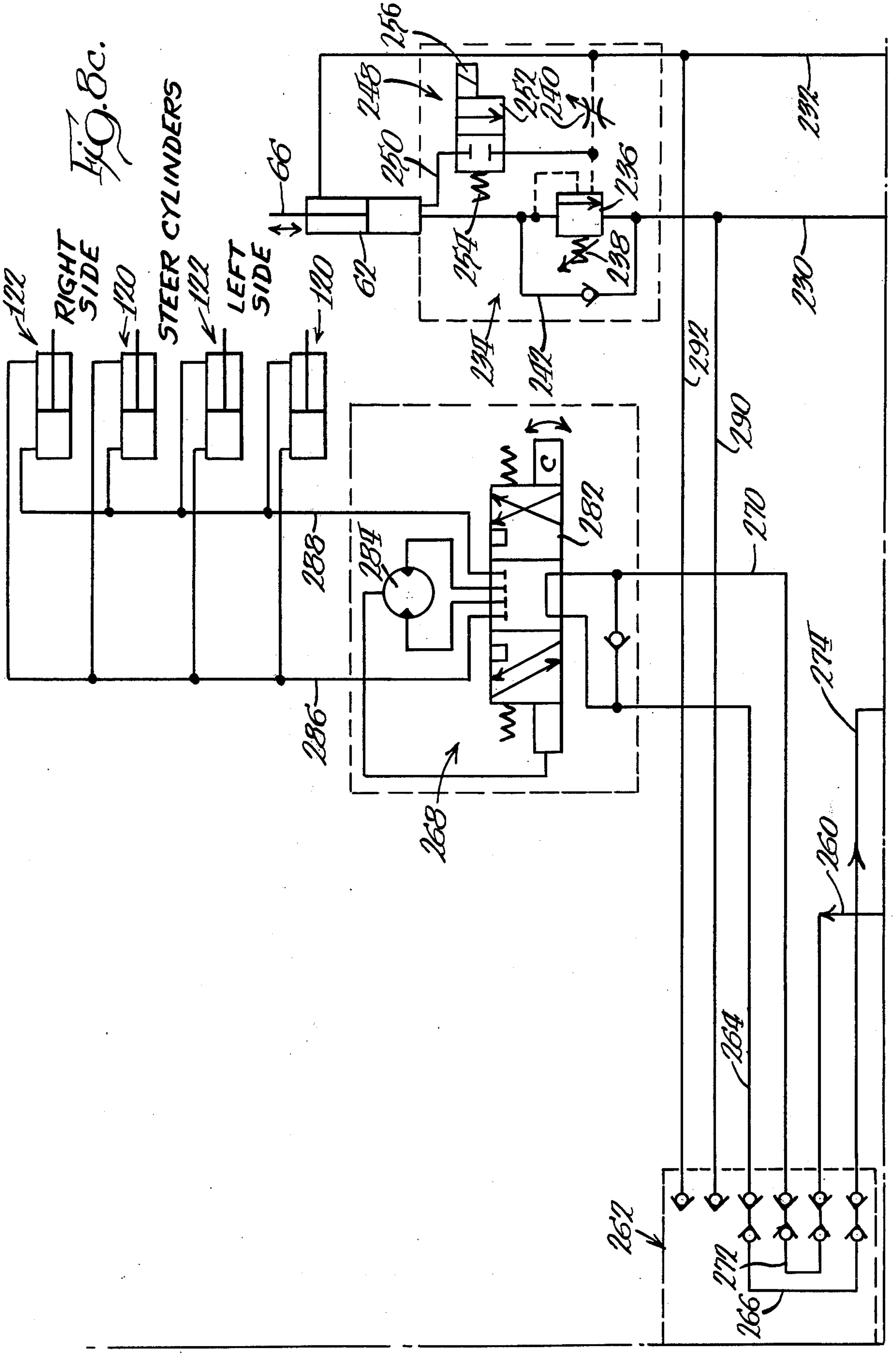
Figure 8D:
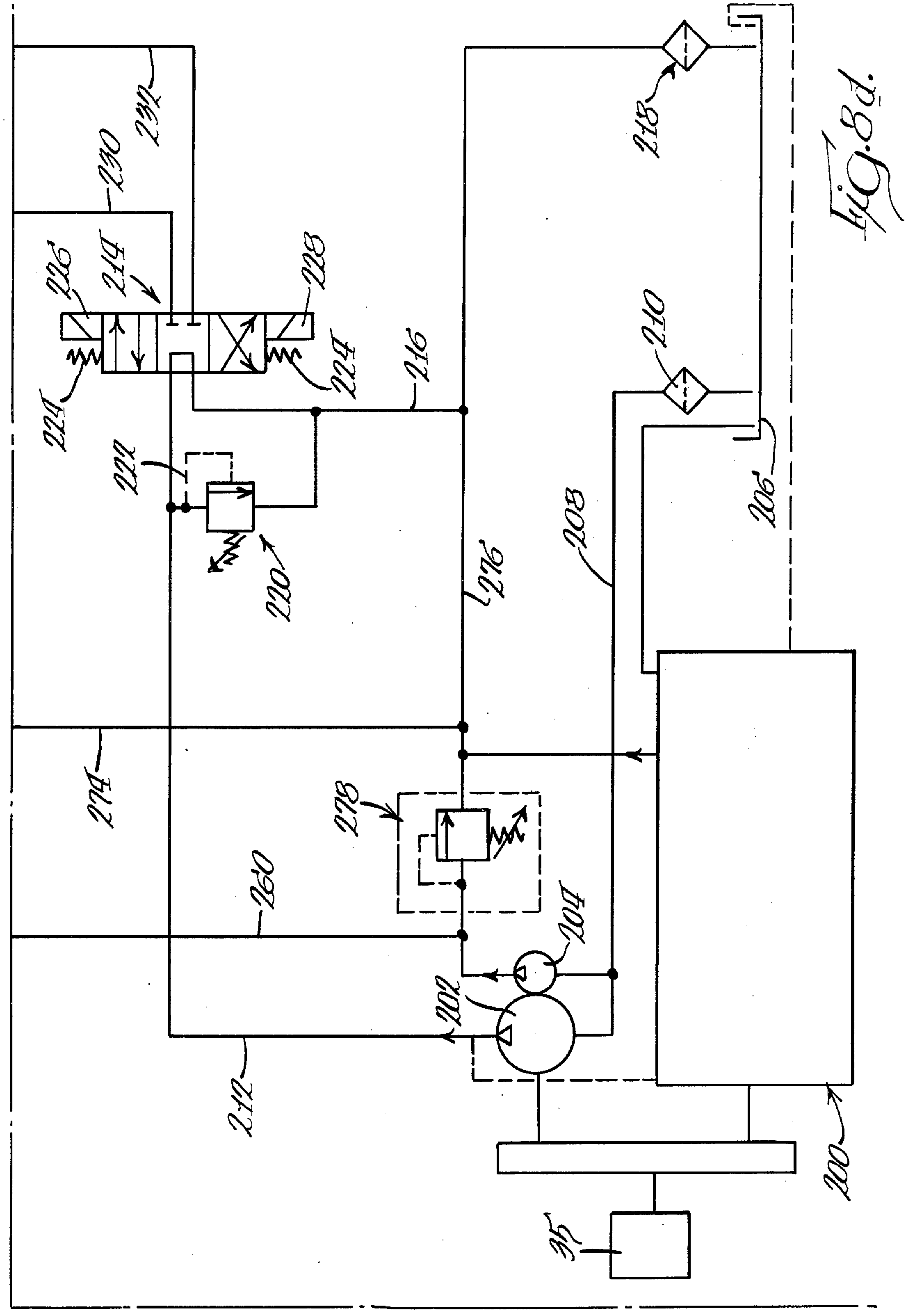
Figure 9:
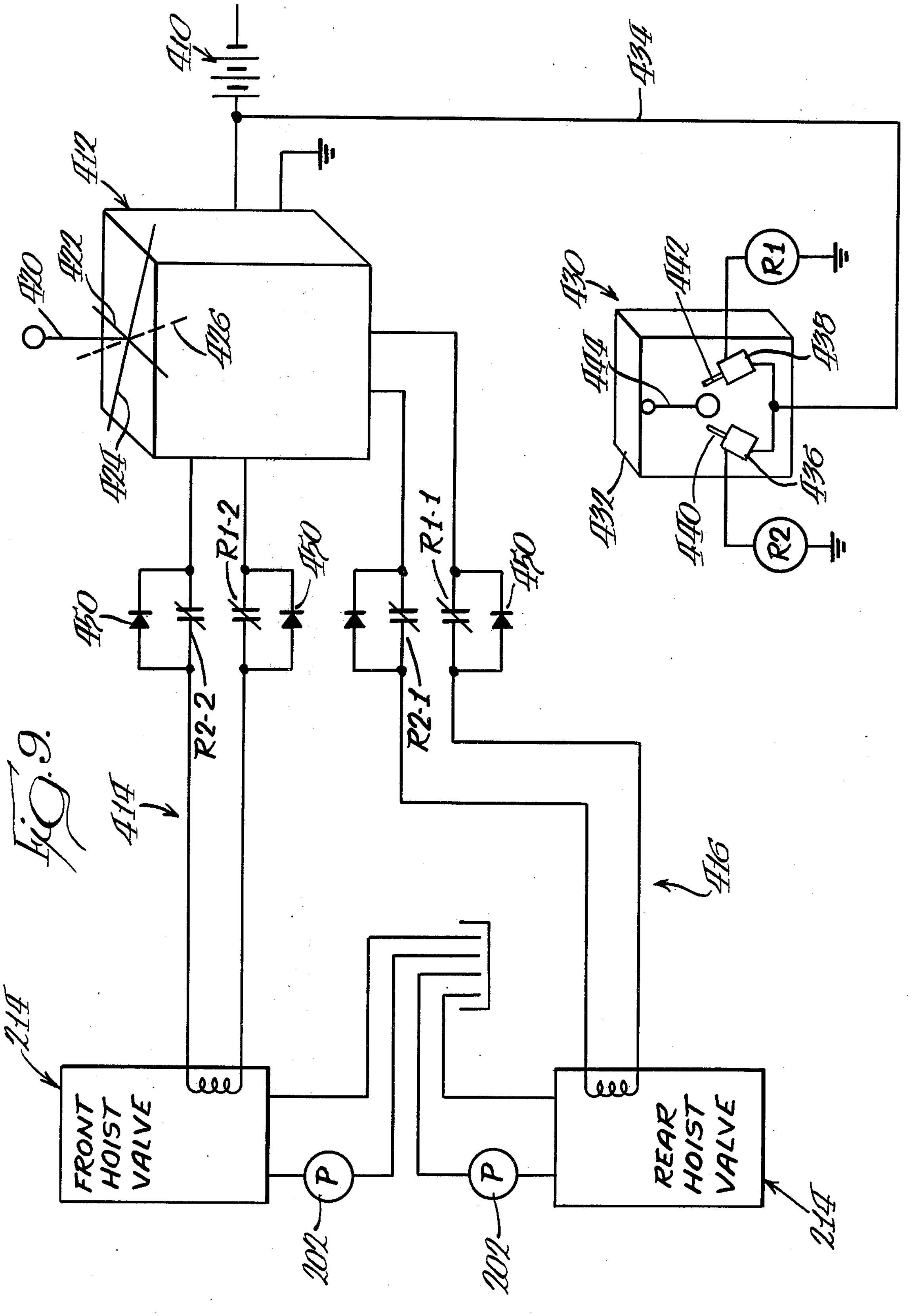
Figure 10:
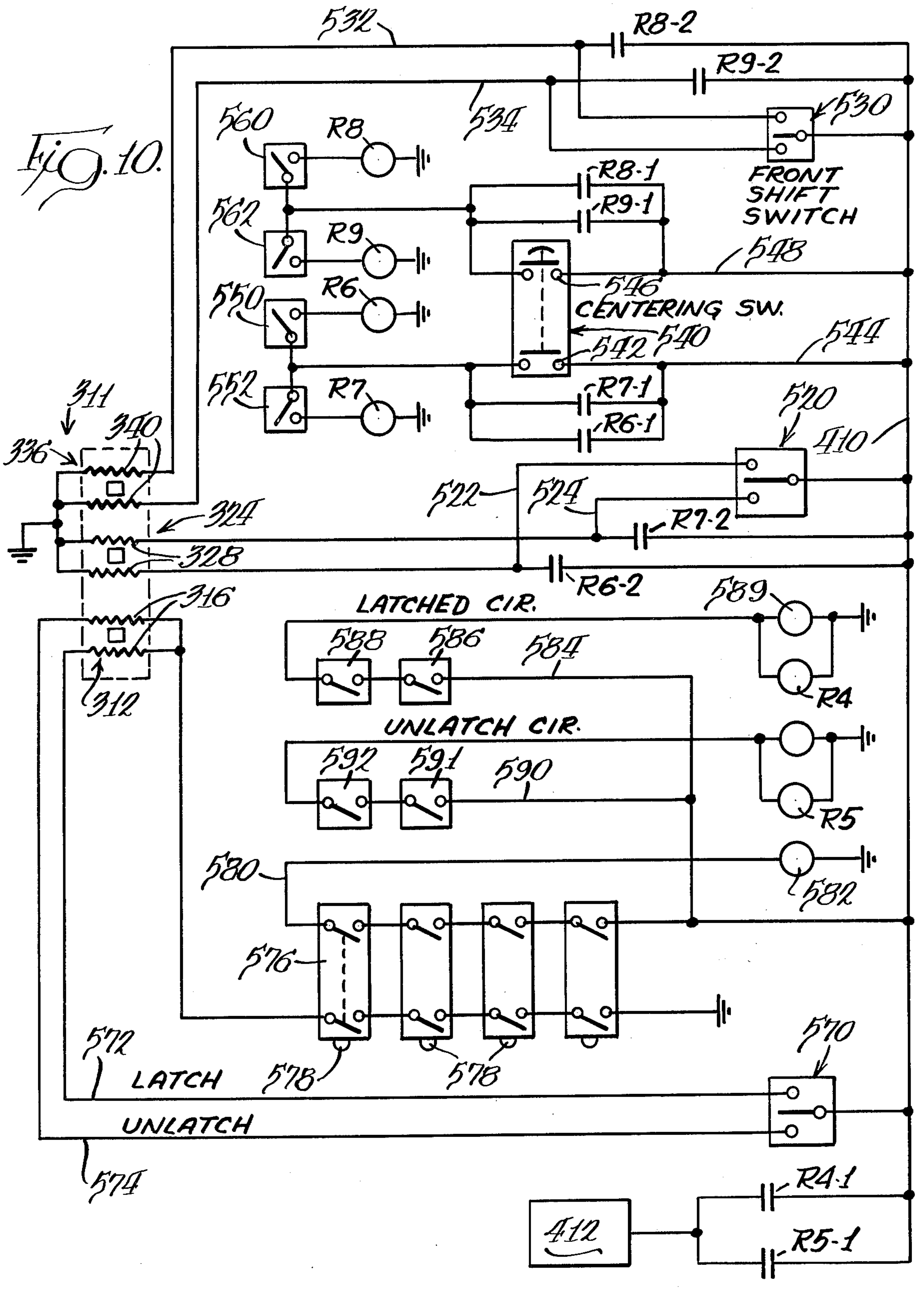

FIGS. 8a thru d respectively are the four sections of the hydraulic circuit shown in FIG. 8;

FIG. 9 shows the fragmentary portion of the hydraulic and electric circuit for controlling flow of hydraulic fluid to and from the spreader hoisting fluid rams; and FIG. 10 is a fragmentary view of the electrical circuit associated with the valves for supplying hydraulic fluid to the spreader side shift fluid rams.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the invention to the embodiments illustrated.

General Arrangement

FIGS. 1 through 4 show a straddle carrier or vehicle, generally designated by the reference numeral 10, which consists of a generally inverted U-shaped frame 12 having an upper horizontal portion 14 and a pair of spaced legs 16 depending from opposite edges of the upper horizontal portion. Each leg 16 is supported at its lower end by a plurality of wheels 18 as will be described in more detail later.

Frame structure 12 is most clearly illustrated in FIGS. 1 through 4 and each of the vertical legs 16 includes two longitudinally spaced, vertically extending hollow columns 20 that are interconnected at their lower ends by an elongated hollow column 22 and at their upper ends by an elongated hollow beam 24. The upper ends of the respective hollow vertical columns 20 are interconnected by transverse horizontal hollow columns 26 to define the generally inverted U-shaped frame that defines an elongated open cargo receiving bay 28.

The frame structure also has an operator's compartment or cab 30 supported at one corner of the vehicle frame and the cab is accessible through a ladder 31 attached to one vertical column 20. In the subsequent description, the end of the frame having cab 30 supported thereon, will be referred to as the forward or front end, while the opposite end will be referred to as the rear end. However, it should be pointed out that, as will be described later, the vehicle is capable of being operated in either direction at a full range of speed and therefore the terms front and rear are being used only for descriptive purposes.

According to one aspect of the invention, vehicle 10 has first and second engine compartments 32 and 24 respectively supported on lower horizontal columns 22 of the first and second legs. First and second separate engines 35 and 36 (FIGS. 8c and 8d) are respectively supported in the engine compartments and each engine drives a plurality of pumps for supplying hydraulic fluid to a plurality of motors and rams, as will be explained later.

Vehicle 10 also incorporates a spreader 40 supported for vehicle movement within open bay 28 through a hoisting mechanism that will be described in more detail later.

Spreader and Hoisting Mechanism

Spreader 40 consists of a generally elongated lattice frame structure 42 that has two pairs of transversely aligned openings 44 adjacent the respective corners thereof. First and second elongated transversely extending beams 46 extend through the respective pairs of openings and each beam 46 terminates adjacent one of the vertical columns 20. The respective outer ends of the horizontal beams 46 have Nylatron blocks 48 secured thereto, which are guided for vertical movement in open guide members 50 that are secured to vertical columns 20.

The respective beams are supported within the respective openings 44 through cushioning members or resilient shock absorbing elements 52, that normally maintain beams 46 in a forward and aft centered position with respect to the elongated open bay 28 but accommodate some forward and aft movement of the spreader with respect to the beams.

The spreader is capable of being shifted transversely of beams 46 to accurately align the spread with a container after the container is located in elongated bay 28. For this purpose, first and second fluid rams 54 and 56 are respectively interposed between the respective beams 46 and opposite ends of spreader 40. The operation of these fluid rams will be described in more detail later.

Spreader 40 is adapted to be raised and lowered through hoisting fluid ram means consisting of first and second hoisting fluid rams 60 that are respectively located in diagonal vertical hollow columns 20 and connected to spreader 40 through flexible members, as will be described later. Since the interconnection between the respective fluid rams 60 and spreader 40 is the same for both fluid rams, only one will be described in detail with particular reference to FIGS. 7 and *7a.*

As shown in FIG. *7a,* fluid ram 60 includes a first element or cylinder 62 that has a rigid plate 64 secured intermediate opposite ends thereof, as by welding and plate 64 is secured to hollow vertical column 20 at the upper end thereof. The major portion of cylinder 62 is located within hollow column 20 and has a piston rod or second element 66 extending from the lower free end thereof. Piston rod 66 has a pulley 68 secured to the lower end thereof through a clevis 70.

Three flexible members are utilized for operatively connecting the free end of piston rod 66 to one end of spreader 40. As more clearly shown in FIG. *7a,* the operative interconnection includes first, second and third transversely spaced flexible members 72, 74, and 76 that each have one end thereof fixedly secured to the frame, particularly to an inner surface of hollow column 20 and 78. All three flexible members extend over pulley 68, secured to the free end of piston rod 66, and then extend vertically within column 20 and are entrained over an idler pulley 80. This idler pulley 80 is located adjacent the intersection between hollow interconnecting column 26 and vertical column 20 which are in communication with each other through an opening 82. The two outer flexible members 72 and 76 are entrained over an additional pulley 84 that is located within hollow column 26 in vertical alignment with one corner of the spreader and these two flexible members are connected to the corner of spreader 40. The connection between flexible members 72 and 76 and spreader 40 includes an equalizing link 77 pivotally connected to the spreader and to both links. The intermediate flexible member 74 is entrained over a further pulley 86 that is generally vertically aligned with the second corner of the spreader and flexible member 74 is connected to the second corner of spreader 42.

With the above arrangement of interconnecting a single fluid ram to two corners of the spreader, the load on the respective corners of the spreader will at all times be equally distributed over the respective pulleys. For example, should the majority of the load be supported by the corner portion of the spreader having the two flexible members 72 and 76, secured thereto, the load on this corner would still be spread equally onto pulleys 68 and 80 because the two flexible numbers are equally spaced from the centers of the pulleys. This reduces the wear on the pulleys and eliminates any bending stresses that would otherwise be developed on piston rod 66.

Spreader frame 42 has four latches 87 located at the respective corners of the frame and each latch is capable of being moved between latched and unlatched positions by rotation of the latching mechanism through an arc of 90 degrees. Since the latching mechanisms 87 are a "standard" in the industry, no detailed description thereof appears to be necessary.

Latches 87 are moved between latched and unlatched positions through a fluid ram 88 that is connected to a rod 89 extending across the center of spreader frame 42. The opposite ends of rod 89 have arms 90 extending therefrom and arms 90 are respectively connected to the respective latches through links 91. Thus, extension of the piston rod of fluid ram 88 will rotate latches 87 to a latched position so that a container can be locked to spreader 40 while retraction of the piston rods will unlatch the container from the spreader 40.

As was indicated above, the carrier is also designed to be capable of handling containers of two different sizes, such as 20 foot containers and 40 foot containers. Spreader 40 is designed to be able to attach a 20 foot container thereto. If it is desired to lift and transport 40 foot containers, a second or daughter spreader 92 is aligned with the first or mother spreader 40 and is connected thereto by four latching assemblies 93 that are carried by mother spreader 42 and are received into openings (93*a*) in the daughter spreader 92. The respective latches 93 may be moved between positions through a manual lever 94 connected thereto through links 95.

The respective latches 87 on the four corners of the daughter spreader are preferably moved between the latched and unlatched positions through separate fluid rams that cooperate with opposite ends of the spreader. Thus, as shown in the drawings, each end of spreader 92 has a fluid ram 96 supported thereon which is connected to a pair of latches 87 on one end of the spreader through a linkage 97.

STEERING SYSTEM

As indicated above, each leg of the vehicle is supported by four wheels that are rotated about fixed vertical axes on the respective legs of the vehicle. Preferably the rotational support for the wheels also provides the suspension for the vehicle to cushion the vehicle from shock forces which may result from traveling over uneven terrain. Accordingly, the support for each wheel consists of a telescoping column 100 that includes outer and inner telescoping members with a plurality of rubber bonded to metal pads between the two members. This type of suspension system is commercially available as an "Off-Highway Suspension System With Modular Impact Pads" that is sold by the Dynafloat Division of Unit Rig and Equipment Co., Tulsa, Oklahoma.

The steering system includes a separate linkage system for each set of four wheels on opposite sides of the vehicle, with the respective linkage systems interconnected as will be described later. Each linkage system 102 includes a first arm 104 that is connected at one end to a shaft 106 which is rotatably supported on horizontal column 22. The arm is located between the rear adjacent pair of wheels 18 and is connected to the respective wheels through first and second links 108 and 110. Likewise, the forward pair of wheels 18 have a link 112 supported on a shaft 114 that is located between the two wheels and is rotatably supported on horizontal column 22. Second arm 112 is again connected to the adjacent forward pairs of wheels 18 through links 116 and 118.

The respective arms 104 and 112 are rotated to turn the respective wheels 18 through first and second fluid rams 120 and 122 that are interposed between the free ends of arms 104 and 112 and horizontal column 22 of legs 16. Thus, both pairs of wheels are independently turned by supplying hydraulic fluid from a steering system, to be described later, to the respective fluid rams. Of course, it will be appreciated that the respective pairs of wheels on one side of the vehicle must be turned in different directions so that all of the wheels have the common radius of turn. In order to insure that both sets of wheels on one side are turned in synchronized relation to each other, the intermediate two wheels are also interconnected with each other through an arm 124, that is pivoted intermediate its ends on a shaft 126 and is connected through one link 127 to one of the intermediate wheels and through a second link 128 to the other of the intermediate wheels. Thus, all four wheels on one side of the vehicle are simultaneously turned when hydraulic fluid is applied to fluid rams 120 and 122. All of the links are preferably adjustable in length so that the turning movement of the respective wheels can be independently adjusted.

In addition, the steering system also incorporates a cross-linkage interconnection between the two linkage systems 102 on the respective legs of the vehicle. As most clearly shown in FIGS. 2 and 4, the two vertical shafts 106 extend upwardly and are supported at their upper ends on brackets 130 that are secured to upper horizontal columns 24. The upper ends of shafts or rods 106 each have a link 132 rigidly secured thereto with the two links 132 interconnected by a cross-member 134 which is preferably adjustable in length. Thus, the rigid interconnection between the two linkage systems on the respective sides of the vehicle will insure a synchronized turning movement of all the wheels when hydraulic fluid is supplied to the respective fluid rams, as will be described later.

The linkage system is therefore extremely compact in transverse dimension and is located within the confines of the lower horizontal column 22.

HYDRAULIC CIRCUIT

As indicated above, the vehicle of the present invention incorporates first and second separate engines 35, 36, that are respectively supported on the two vertical legs of the vehicle frame. One of the unique aspects of the present invention is the fact that the hydraulic circuit is designed so that each engine drives a plurality of pumps that supply pressurized fluid to control a plurality of functions and the hydraulic circuit is designed to be capable of interconnecting the respective hydraulic circuits in such a manner that all of the functions can be performed utilizing the pumps of only one engine. This is extremely important in a large straddle carrier of this type if the operator should encounter a failure of one engine while a container is being supported in a transport position on the spreader. The portions of the hydraulic circuit having power supply thereto from each engine will be described separately and then the unique interconnecting means will be described in conjunction with both portions of the circuit. Referring to FIGS. 8c and 8d engine 35 is connected through drive means 200 to the two intermediate wheels on the leg of the vehicle which supports this engine. The details of the drive means 200 will be described in more detail hereafter.

The engine also drives first and second tandem pumps 202 and 204 which respectively supply hydraulic fluid under pressure to control various hydraulic functions for the vehicle. Pumps 202 and 204 are connected to reservoir 206 through a conduit 208 having a filter 210 therein. The output from pump 202 is supplied through conduit 212 to a hoist valve means 214 which also has a return conduit 216 connected thereto, to deliver return fluid to reservoir 206 through a filter 218. Pressure relief valve means 220 interconnects conduits 212 and 216 and has its pressure port connected to the conduit 212 through a branch conduit 222.

Hoist valve means 214 is a three-position valve that is normally biased to a neutral center-closed position by springs 224 wherein conduits 212 and 216 are interconnected and pressurized hydraulic fluid delivered from pump 202 is returned to reservoir 206 through filter 218. Hoist valve means 214 is a solenoid operated valve having two solenoids 226 and 228 on opposite ends thereof so that the valve can be moved from the illustrated neutral position in either direction and supply pressurized fluid to either conduit 230 or conduit 232. Hoist valve 214 may also be a proportional valve, as will be described later.

Conduit 232 is connected directly to the rod end of one cylinder 62 while conduit 230 is connected to the head end or other end of cylinder 62 through the pressure responsive valve means 234. Pressure responsive valve means 234 consists of a uni-directional valve 236 that is normally biased to a first position by a spring 238 which blocks flow from conduit 230 to the head end of cylinder 62. Uni-directional pressure responsive valve 236 is connected to conduit 232 through a restrictor valve 240. Also pressure responsive means 234 has a parallel branch conduit 242 interconnecting conduit 230 at opposite sides of pressure responsive valve 236 so that flow can be directed from valve 214 directly to the head end of cylinder 62 bypassing pressure responsive valve 236.

Figure 1:
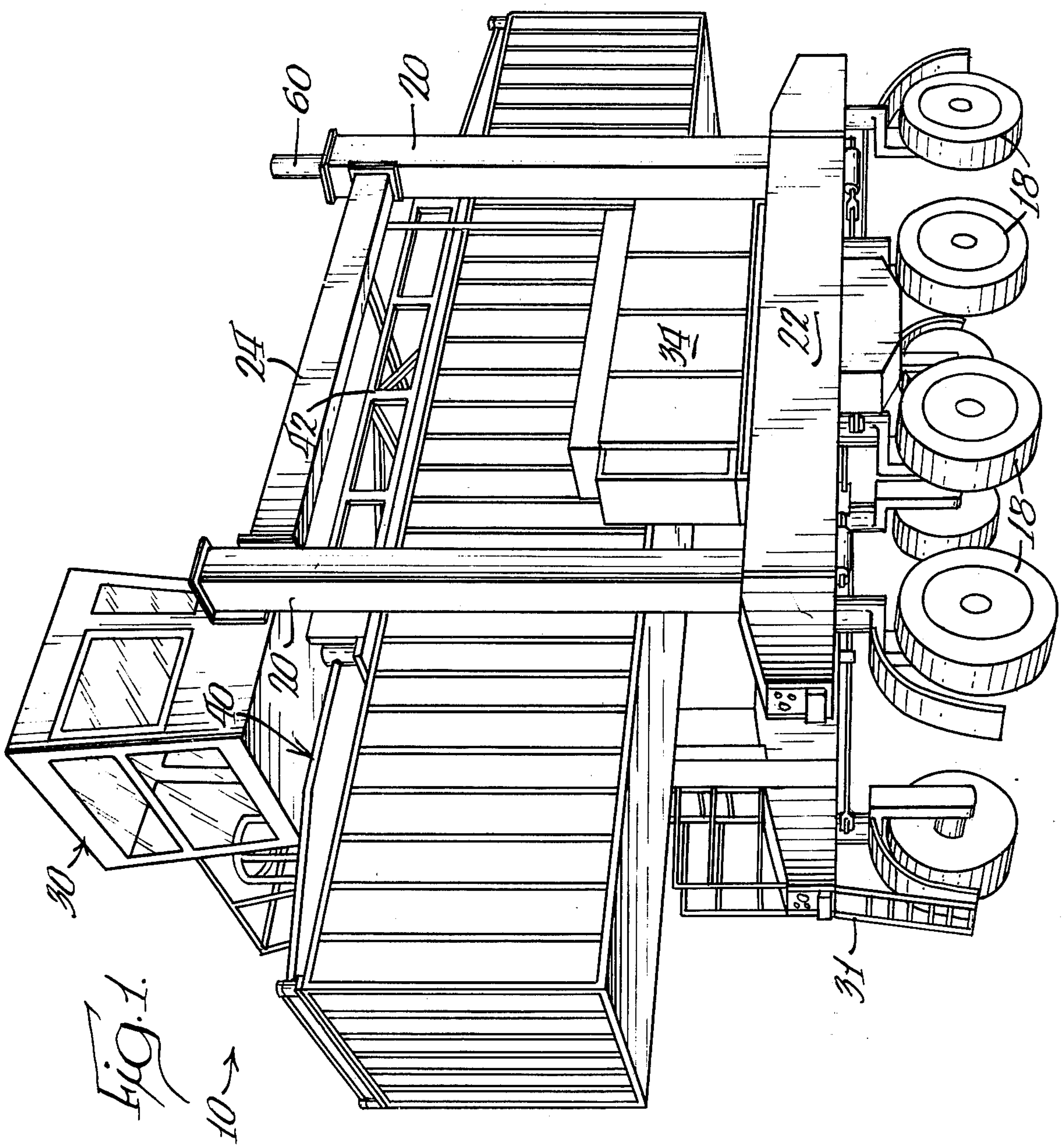
FIG. 1 shows a perspective view of the straddle carrier having the various features of the present invention incorporated therein.
Figure 2:
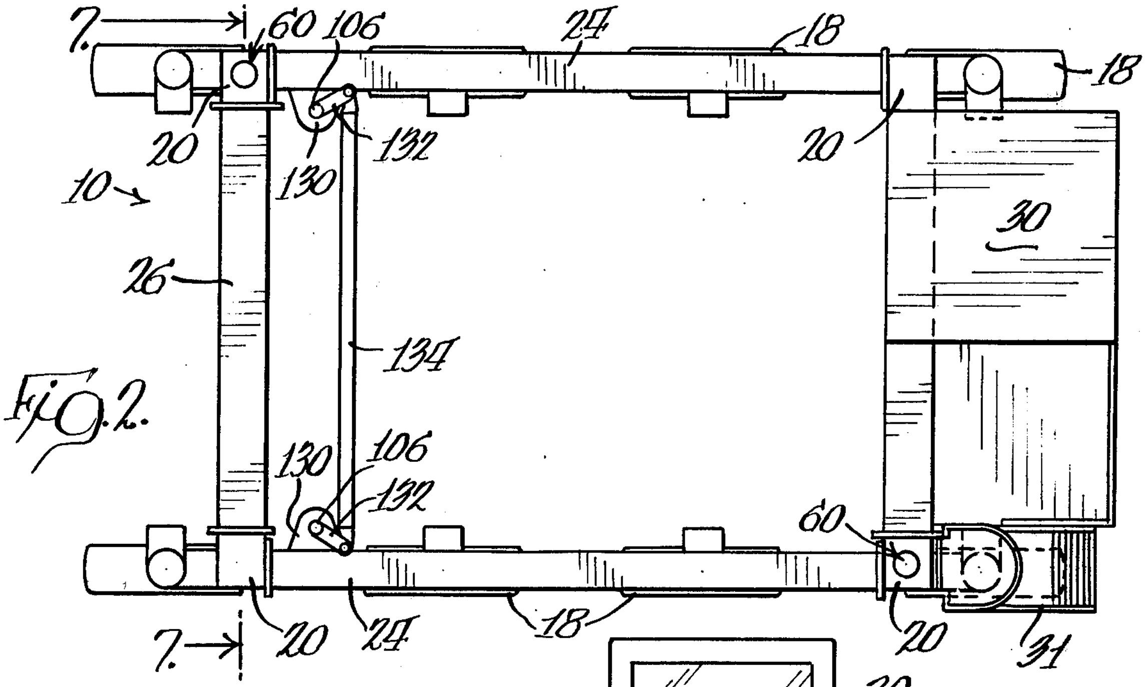
FIG. 2 is a plan view of the straddle carrier with the spreader deleted therefrom.
Figure 3:
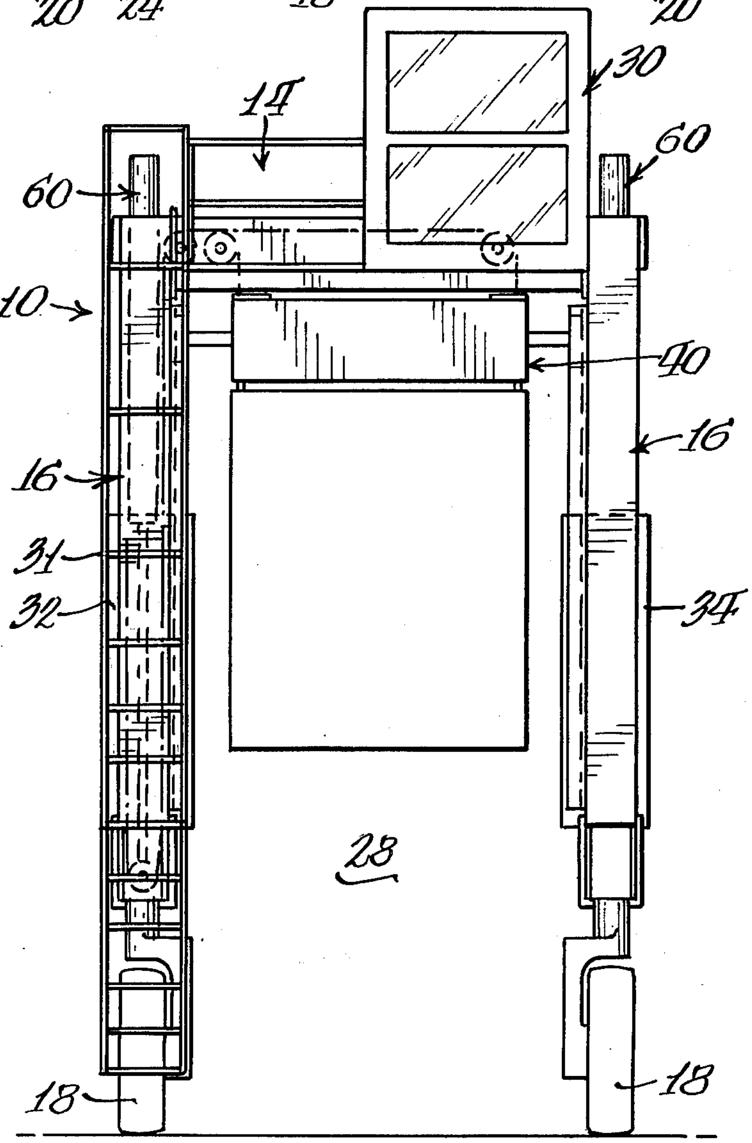
FIG. 3 is an end view of the straddle carrier showing a container being supported therein.
Figure 4:
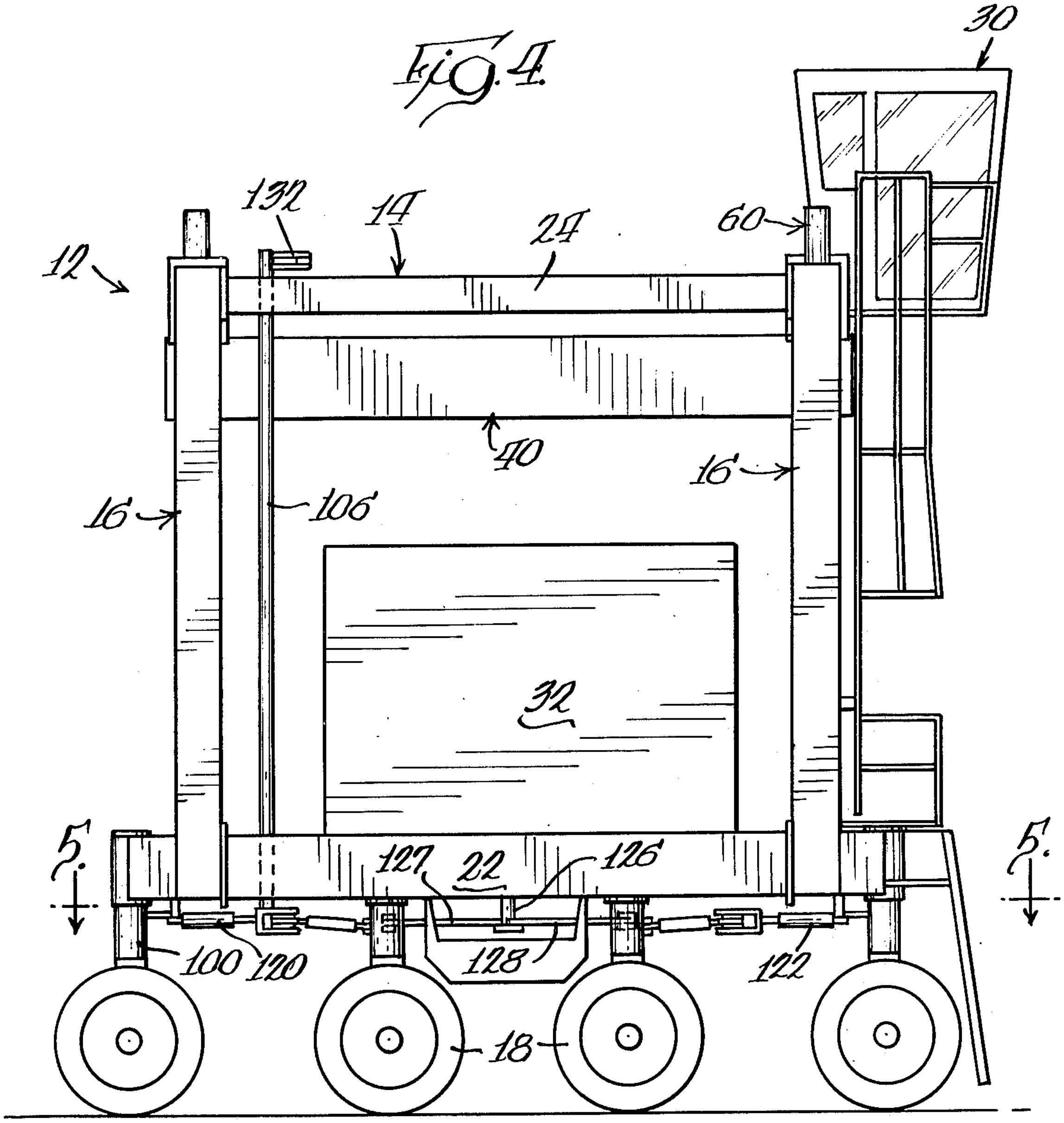
FIG. 4 is a side elevation view of the straddle carrier shown in FIG. 1.
Figure 5:
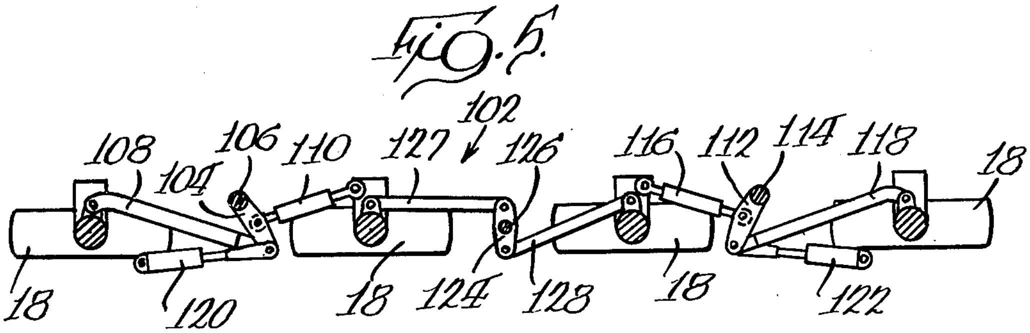
FIG. 5 is a fragmentary horizontal section as viewed along line 5—5 of FIG. 4.
Figure 6:
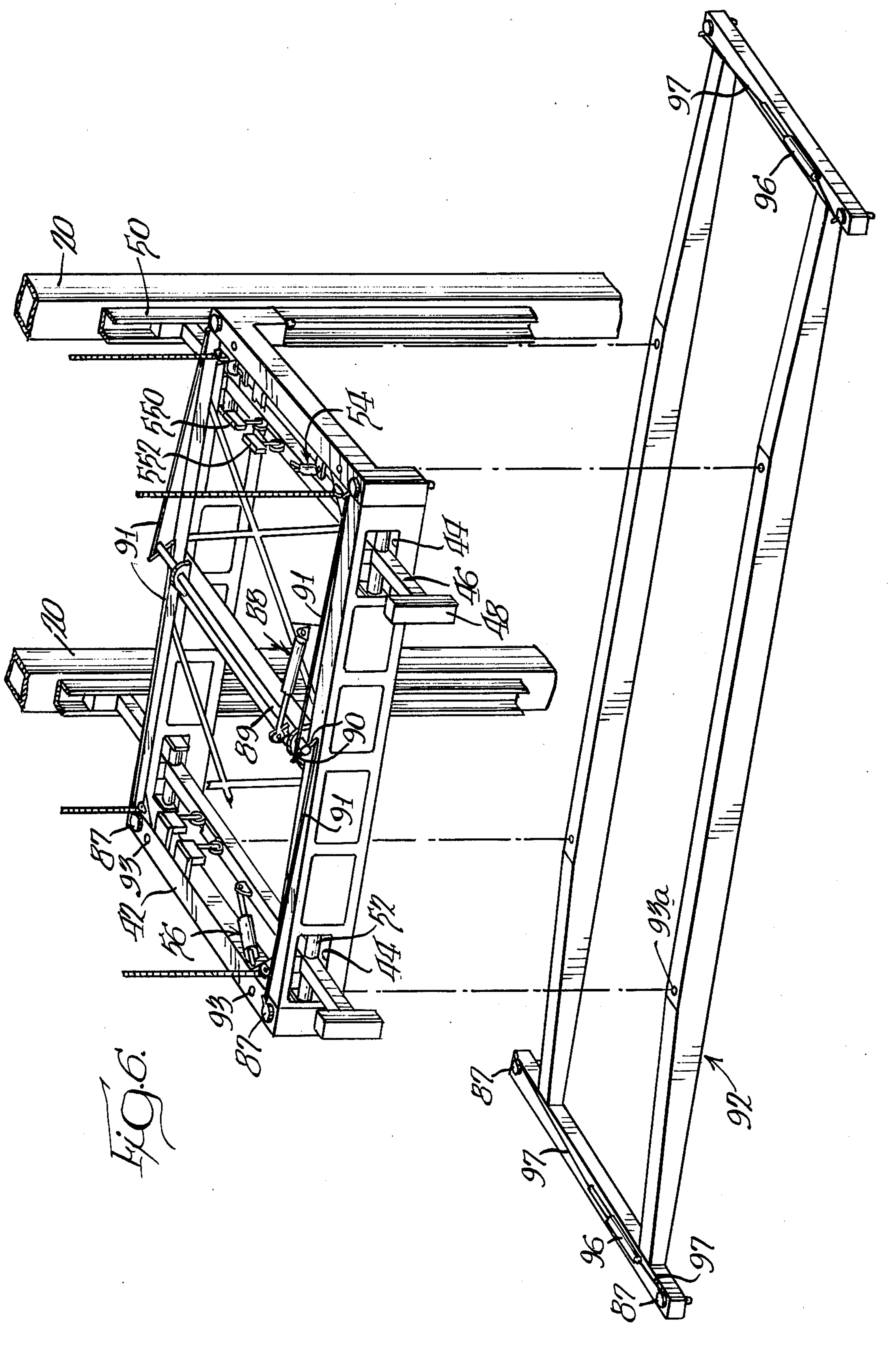
FIG. 6 is a perspective view of the spreader that forms part of the straddle carrier shown in FIG. 1 and its support on the frame.
Figure 7:
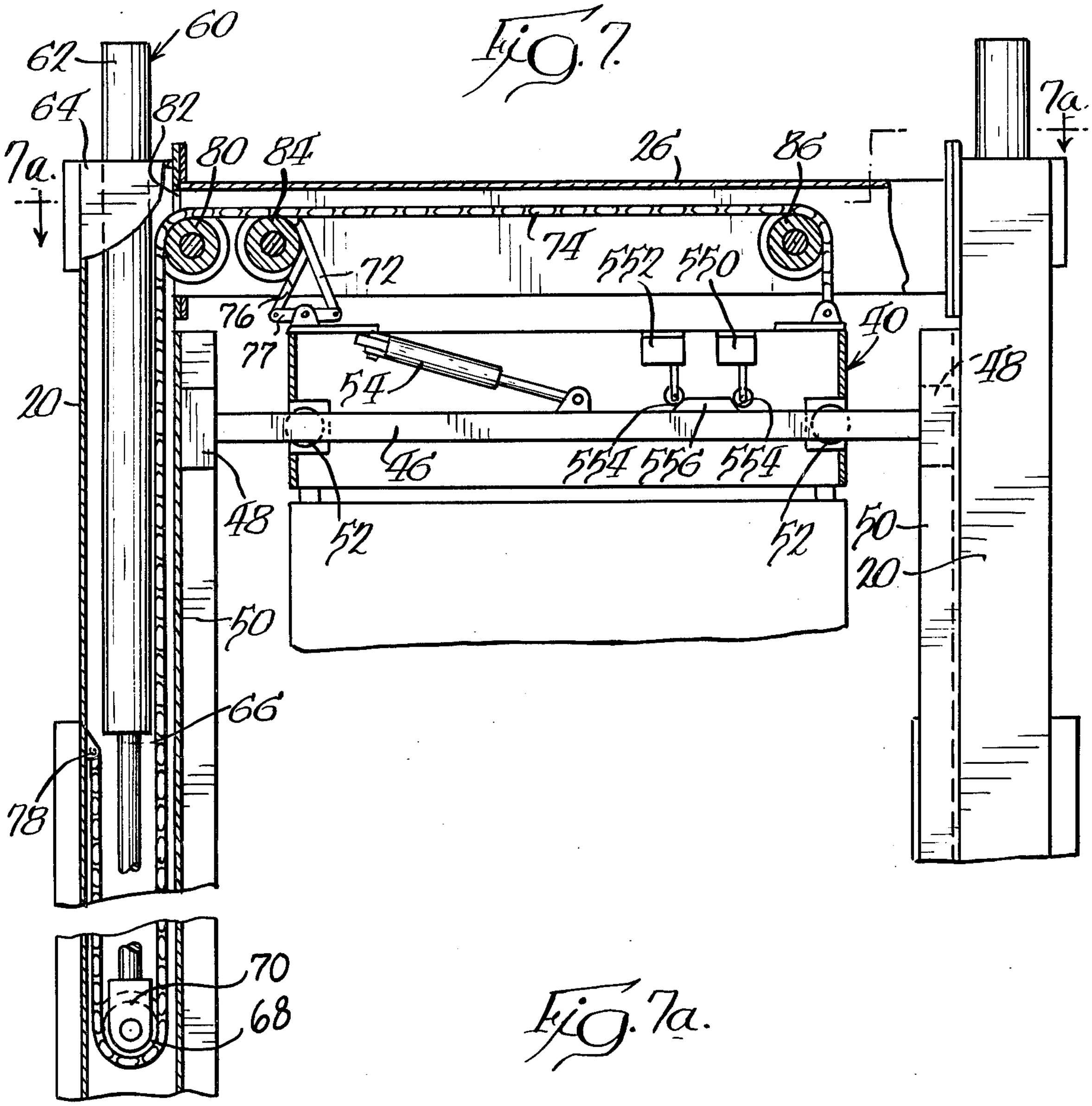
FIG. 7 is a fragmentary vertical sectional view as viewed along line 7—7 of FIG. 2.
Figure 7A:
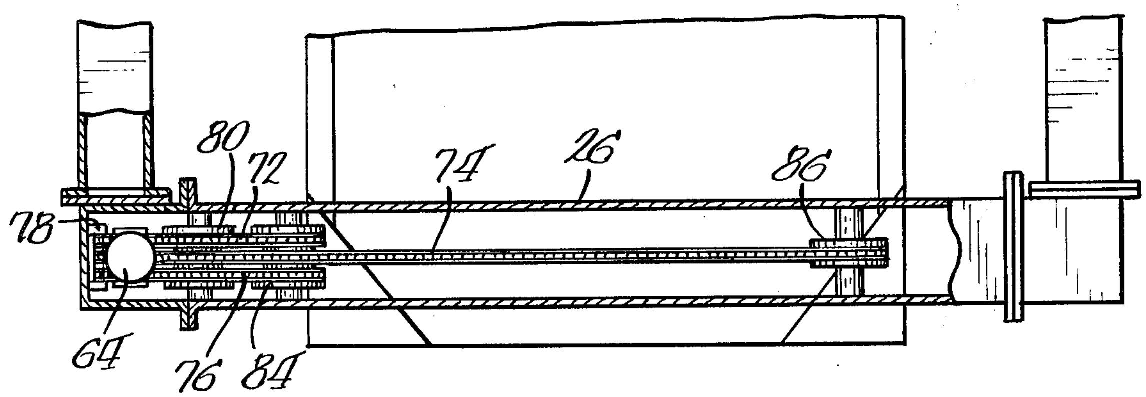
FIG. 7a is a fragmentary sectional view as viewed along 7a—7a of FIG. 7.

With the hoisting circuit so far described, and considering the hoisting circuit in conjunction with FIGS. 7 and 7a of the drawings, it will be noted that energizing solenoid 226 of valve means 214 will connect conduit 212 to conduit 230 and conduit 232 to conduit 216 so that pump or pressurized fluid source 202 is connected to the head end of cylinder 62. The pressurized fluid will flow through bypass conduit 242 to extend piston rod 66 and raise one end of spreader 40. Likewise, energizing solenoid 228 will connect pressurized fluid source 202 to the rod end of cylinder 62 through conduits 216, 232 while connecting the head end of cylinder 62 to the reservoir through conduits 230 and 216. However, before fluid can flow through conduit 230 from the head end of cylinder 62, the pressure in conduit 232 must be sufficient to maintain pressure responsive valve 236 in an open condition. Thus, pressure responsive means 234 insures that the operator has complete control of lowering the spreader. This is particularly important if for any reason the pressurized fluid source to the rod end of cylinder 62 would be lost. If such condition would occur and valve 214 were in the operative position to lower the spreader, the weight of spreader 40 would rapidly force the fluid from the head end of the cylinder. Thus, the pressure responsive means 234 insures that the spreader does not inadvertently fall when hydraulic pressurized fluid is lost and valve 214 in an open condition.

The hydraulic circuit for supplying fluid to hoisting fluid ram 60 also incorporates a unique circuit bypass arrangement for readily accommodating lowering of the spreader, if for some reason pump 202 becomes inoperative. In the hydraulic circuit disclosed herein, the hydraulic hoisting circuit also incorporates normally closed valve means 248 in a conduit 250 between the head end of cylinder 62 and pressure responsive means 234. Normally closed valve means 248 consists of a solenoid operated valve 252 that is normally biased to a first closed position by a spring 254 and has a solenoid 256 cooperating therewith. Thus, if for any reason, pressurized fluid is not available for delivery into conduit 232 to lower the spreader, solenoid operated valve means 248 can be operated by energizing solenoid 256 to thereby connect the head end of cylinder 62 to pressure responsive valve 236 and allow the weight of the container supported on spreader 40 to force pressurized fluid from the head end of cylinder 62 to reservoir 206.

The second pump 204 of the pair of pumps or tandem pumps 202, 204, driven by the engine 35 delivers pressurized fluid through conduit 260, to a maintenance board or interconnection means 262. Conduit 260 is connected to a conduit 264 leading from maintenance board 262 through a quick-disconnect coupling 266 to a first port of hydraulic power steering system 268.

The second port of power steering system 268 has conduit 270 leading therefrom to maintenance board 262 which in turn is connected by a quick-disconnect coupling 272 to a conduit 274. Conduit 274 is interconnected with return conduit 216 through a branch conduit 276.

Pressure conduit 260 and return conduit 274 are interconnected with each other adjacent pump 204 by a pressure responsive relief 278 so that conduit 260 is connected directly to conduit 274 when the pressure therein exceeds a certain level.

Power steering valve means 268 includes a valve 282 that is moved through an orbital valve 284 and is connected through conduits 286 and 288 to opposite ends of the respective fluid rams 120 and 122. It will be noted that conduit 286 is connected to the head ends of the cylinders of fluid rams 120 and 122 on one side of the vehicle and to the rod ends of the cylinders of fluid rams 120 and 122 on the opposite sides of the vehicle. Also, conduit 288 is connected in the same manner to the respective cylinders at opposite ends of the cylinders.

As shown in FIG. 8*c*, conduits 230 and 232 are also connected to maintenance board 262 through branch conduits 290 and 292, for a purpose that will be described later.

Considering now the hydraulic circuit driven by the other engine 36, particular reference will be made to FIGS. 8*a* and 8*b*.

Engine 36 drives a drive means 200 that is identical to drive means 200 driven by engine 35 and will be described in detail later. Also, engine 36 drives a pair of tandem pumps 202 and 304. Tandem pump 202 supplies hydraulic fluid to the second hoisting fluid ram 60 in a manner identical to that described above in connection with the first hoisting fluid ram and a detailed description of the circuit will not be repeated.

The second pump of the second pair of tandem pumps 304 supplies hydraulic fluid under pressure through conduit 306 which terminates in maintenance board or interconnecting means 262. Conduit 306 is connected to conduit 308 through a quickdisconnect coupling 310 and conduit 308 is connected to bank of valves 311 that supply a hydraulic fluid under pressure to a plurality of fluid rams that are associated with the spreader, such as the side shift fluid rams and the latching fluid rams.

Valve bank 311 has a first valve 312 which is normally biased to a first position through springs 314 and is moved in opposite directions from the centered neutral position through solenoids 316. Valve 312 is connected to opposite ends of the cylinder(s) of the latching fluid ram(s) 88 or 96 through a pair of conduits 318 and 320.

Valve 312 is an open center valve wherein fluid is directed from conduit 308 to conduit 322 when valve 312 is in a neutral condition. Conduit 322 is connected to a second valve 324 in valve bank 311 which again is normally biased to a centered neutral position through springs 326 and is moved to two operative positions through solenoids 328. The two outlet ports of valve 324 are respectively connected to opposite ends of the cylinder of the first side shift fluid ram 54 through conduits 330 and 332. A center open port of the valve 324 is connected through a conduit 334 to a third valve 336 which is spring biased to the neutral centered position illustrated by springs 338 and is moved to two operative positions by solenoids 340. Again, the two outlet port of valve 336 are connected through conduits 342 and 344 in opposite ends of the cylinder of the second side shift fluid ram 56. The center port of valve 336 is connected to interconnection means or maintenance board 262 through a conduit 350 which in turn is connected through quick-disconnect coupling 352 to a conduit 354 which returns fluid to the reservoir through conduit 216 and filter 218.

Conduits 306 and 354 are again interconnected by a pressure responsive relief valve 356 located adjacent pump 304 so that the pump can be connected directly to the reservoir when the pressure of the fluid in pump 304 exceeds a certain level.

Conduit 308 is also connected directly to conduit 350 through a bypass conduit 357 with a pressure responsive relief valve 358 located in conduit 357. Also, one port of each of the valves 312, 324 and 336 is connected to conduit 357 through branch conduits 359. In addition, valve bank 311 has a bypass conduit 360 connected directly to conduit 308 and connected to an inlet port of each of the three valves through a check valve 362. Thus, pressurized fluid is available to the inlet ports of any of the valves regardless of the position of the remaining valves.

With the hydraulic circuit described above, during normal operation, both engines are operating and one engine will drive a pair of wheels on one side of the vehicle through drive means 200 and at the same time, drive the first pair of tandem pumps 202 and 204 while the second engine will drive two wheels on the opposite side of the vehicle and will drive the second pair of tandem pumps 202 and 304. The first pumps 202 of the respective pairs of tandem pumps, will respectively supply hydraulic fluid to the two hoisting rams 60 that are located on the respective legs of the vehicle frame. Pump 204 will supply the necessary fluid to the hydraulic power steering system for turning the respective wheels, while pump 304 will supply pressurized fluid to valves 312, 324 and 336, which respectively control the flow of fluid to the latching fluid ram(s) and side shifting fluid rams.

Considering now that one of the engines fails, such as engine 36 which drives one of the drive means 200, one of the pumps 202 and the second tandem pump 304 which supplies pressurized fluid to the fluid rams on the spreader. In order to supply all of the necessary hydraulic fluid for operating all of the functions on the vehicle, disconnect couplings 266, 272, 310 and 352 are removed and the return conduit 264 from power steering valve 282 is connected to conduit 308 through a quick-disconnect coupling, while return conduit 350 from the bank of valves 311 is connected to return conduit 274 of the power steering system. Thus, pressurized fluid is supplied from pump 204 through power steering valve 282 and the return fluid from power steering valve 282 passes through the bank of valves 311 so that the pressurized fluid can be utilized for latching or unlatching the container from the spreader, as well as transversely shifting the spreader as required.

Also, in order to operate both hoisting cylinders from one of the pumps 202, the first pair of conduits 290 are interconnected at the maintenance board 262 by a first quick-disconnect coupling while the second pair of conduits 292 are interconnected through a second quick-disconnect coupling so that one of the pumps 202 can supply fluid to both hoisting fluid rams 60. It will be noted that the two fluid rams 60 are connected in parallel with the single remaining operative pump 202 so that pressurized fluid is simultaneously supplied to both of the fluid rams.

If both engines fail while a container is attached to the spreader and the spreader was in a fully raised position, the container can still be lowered to the ground to eliminate a hazardous condition as long as electrical power is available. It will be appreciated that the electrical power source for this type of vehicle, consists of batteries which supply power without the engines being operative. In order to lower the spreader supporting the container, solenoid valves 248 are energized through solenoids 256 so that the head ends of cylinders 62 are connected to pressure responsive valves 236 which will move the valves to the opened condition. In this condition, the weight of the container and the spreader will force the fluid from the head ends of cylinders 62 to lower the container, supported on the spreader, to the ground.

Drive Means

Drive means 200 between the respective engines and the respective wheels on the opposite side of the vehicle, may take a variety of forms and one type of drive means has been illustrated and will be described for purposes of completeness. Drive means 200 includes a main pump 365, driven by the engine and a charge pump 366 which is also driven by the engine. Main pump 365 is a variable displacement reversible flow pump so that pressurized fluid may be delivered to either conduit 367 or 368. Conduits 367 and 368 are both connected to opposite sides of a pair of fluid motors 370 through conduits 372. Conduits 372 each have a filter 374 located therein and the filters 374 are designed so that the flow of fluid passes through the filter when fluid is traveling in one direction and bypasses the filter when fluid is traveling in the opposite direction. Thus, when, for example, pressurized fluid is delivered through conduit 367, the fluid that is delivered to the right hand pump as viewed in FIG. **8*b*** is filtered, while the fluid delivered through the left hand pump bypasses the filter.

Charge-pump 366 is connected to reservoir 206 through conduit 275, having a filter 376 therein. Charge pump 366 is a constant displacement pump delivering a constant supply of fluid to a conduit 378 which is connected to conduits 367 and 368 through uni-directional check valves 380 and is connected to reservoir 206 through a pressure relief valve 382 and conduit 383. Thus, pressurized fluid is automatically added to the closed loop system, inlcuding pump 365, conduits 367, 368 and 372 as well as motors 370 whenever such fluid is necessary. For example, if conduit 367 is pressurized, the pressure of the fluid therein will always be greater than the relief valve setting of relief valve 382 to maintain the lower check valve 380 in the closed condition. If the closed loop path is in need of additional fluid, the pressure in conduit 368 will drop below the pressure setting for relief valve 382 and will thereby open the upper check valve 380 to supply charge pressure fluid to conduit 368.

The drive means 200 also incorporates the high pressure relief system for interconnecting conduits 367 and 368 any time there is a sudden surge of pressure of the fluid in either conduit. This is accomplished by connecting conduits 367 and 368 through a conduit 384 having first and second pressure relief valves 385 and 386 defining parallel circuits in conduit 384. Conduit 387 is connected to pressure relief valve 385 so that this relief valve is opened when there is a sudden surge of pressure in fluid flowing through conduit 368. Likewise, conduit 388 is connected to pressure responsive relief valve 386, to open this valve when there is a sudden surge of pressure of the fluid in conduit 367. With the relief circuit just described, whenever pump 365 is suddenly shut down for any reason, the momentum of the vehicle will result in a rapid rise of pressure in either conduit 367 or 368, which in turn will open an appropriate relief valve 385 or 386 to provide a closed loop path bypassing pump 365. When this condition occurs, there is a rapid buildup of heat of the fluid flowing in the closed loop path through the two drive motors.

in order to provide cooling effect of the oil in the closed loop path, whenever either pressure relief valve 385 or 386 is opened, the hydraulic circuit incorporates means for automatically diverting some of the fluid from the closed loop path, including conduit 384, to the reservoir and adding hydraulic fluid or oil to the system from charge pump 366. This is accomplished by a valve 389 that has two ports respectively connected on opposite sides of relief valves 385 and 386 through conduits 390 and 391. The respective conduits 390 and 391 are connected to opposite ends of valve 389 which is normally biased to a closed center position illustrated in the drawings. The output of valve 389 is connected to return conduit 383 through a further relief valve 392. Relief valve 392 has a pressure setting that is lower than relief valve 382. Thus, whenever either of the relief valves 385 or 386 is opened, the low pressure side of conduit 384 will be connected to reservoir 206 through valve 389 and check valve 392. This means that a certain amount of fluid will flow from the closed loop path through the reservoir and this fluid will be replenished by the charge pump 366.

Relief valves 385 and 386 have hydraulic fluid supplied to both ends so that a smaller spring may be utilized to normally maintain these valves in a closed condition. This is accomplished by connecting conduits 387 and 388 to both ends of valves 385 and 386 through branch conduits 393 and 394. It will be appreciated that high pressure relief valves 385 and 386 are set to open when the pressure of the fluid in the circuit is higher than normal system pressure. Therefore, drive means 200 also has an arrangement to reduce the pressure required to open these valves, should it be necessary to move the vehicle when one engine has failed.

For this purpose, the spring sides of valves 385 and 386, particularly conduits 394 are interconnected through conduit 395 which has a normally closed valve 395 therein. Thus, if the vehicle is moved when the associated engine is not operating, valve 396 can be openedso that the spring side of each valve will be connected to the low pressure conduit 367 or 368 to reduce the pressure required to open valves 385 or 386.

Spreader Anti-Tilt Mechanism

An anti-tilt mechanism is incorporated into the electrical circuitry for actuating the respective hoist valve means 214 and is illustrated in FIG. 9. A voltage source 410, is connected to a controller 412 which in turn is connected to the respective control valves 214 through first and second circuit means 414 and 416. Controller 412 is preferably a commercial item that is sold by Bertea Corporation, Irvine, California, and valves 14 are also commercial units from this same corporation and are identified as electroproportional control valves. Controller 412 has a single control lever 420 which is capable of actuating each valve independently or simultaneously actuating both valves 214. For example, if control lever is moved along axis 422, the rear hoist valve 214 will be actuated while movement of control lever along axis 424 will actuate the front hoist valve 214. Movement of control lever along a third axis 426 will simultaneously actuate both valves so that both ends of the spreader are either raised or lowered.

The electric circuit for energizing either the front or rear hoist valve 214 incorporates attitude control circuit means for automatically interrupting the electric circuit to both valves whenever the spreader reaches a maximum angle with respect to a horizontal reference plane. Attitude control circuit means 430 consists of a control box 432, which is schematically illustrated in FIG. 9 and is connected to voltage source 410 through line 434. Line 434 is connected to first and second normally open switches 436 and 438 that have actuator arm 440 and 442 located in the path of a pendulum 444. Switches 436 and 438 are respectively connected to relays R2 and R1. Relay R1 has first set of contacts R1-1 located in second circuit 416 and a second set of contacts R1-2 in circuit 414. Likewise, relay R2 has a first set of contacts R2-1 in circuit 416 and a second set of contacts R2-2 in circuit 414.

Switches 436 and 438 may be positioned with respect to pendulum 444 so that one of the relays R1 or R2 is energized whenever the spreader reaches a maximum desired angle with respect to a horizontal reference plane. For example, the switches can be positioned so that they are actuated when either the forward or rear end of the spreader reaches an angle of approximately 5 degrees. Assuming that the rear end of spreader 40 were tilted below the horizontal by an angle of 5 degrees, switch 438 would complete the circuit through relay R1 which would automatically open both sets of contacts R1-1 and R1-2 to automatically interrupt the circuits to both valves, preventing any further tilting of the spreader. Likewise, if the front end of the spreader were tilted down by an angle of more than 5 degrees, relay R2 would be energized, which would open normally closed contact R2-1 and R2-2 to interrupt the circuits to both valves 214.

Since the relay contacts will remain open until the spreader is tilted in the opposite direction towards the horizontal reference plane, provision must also be made for actuating valves 214 with either of the sets of relay contacts open. This is accomplished by incorporating bypass switch means in parallel with each of the sets of contact in the respective circuits. In the illustrated embodiment, the bypass or uni-direction switch means consist of diodes 450 which are connected in parallel with each of the sets of contact R1-1, R1-2, R2-1, and R2-2. The respective diodes are responsive to reverse polarity in the respective circuits to be capable of completing the circuits to the respective valves for tilting the spreader away from the maximum attitude.

Thus, attitude control means 430 is operated in response to spreader 40 assuming a selected attitude in either direction from a reference plane and operates or opens switch means that includes normally closed contacts R1-1, R1-2, or R2-1, R2-2 to preclude actuation of first and second valve means 214 thereby preventing an increase of the angular attitude beyond a selected maximum. However, the respective switch means also include uni-directional switches or diodes 450 which permit energization of the respective valve means to reduce the angular attitude of the spreader while the respective relay contacts are open.

Control loop 412 is preferably a commercial unit sold by Honeywell, Minneapolis, Minn. as a level controller, Model No. ACW112A.

Spreader Self-Centering Circuit

The circuit for supplying hydraulic fluid to the respective side-shifting fluid rams 54 and 56 also incorporate self-centering means for automatically centering the spreader between the two legs after a container has been latched thereto. This feature is highly desirable for a large unit of this type since it provides the operator the capability of always placing the container in the same position with respect to the carrier, which will reduce the amount of manipulation required for accurately aligning a container that is to be deposited on top of another container.

The centering means is incorporated into the elecrric circuit that energizes the respective solenoids 328 and 340, associated with the spreader shifting valves 324 and 326. As illustrated in FIG. 10, the electric circuit for supplying current to solenoids 328 and 340, includes a first or rear switch 520 which has two output contacts respectively connected to solenoids 328 on opposite ends of valve 324 through lines 522 and 524. A second or front shift switch 530 is connected to source 410 and is connected to the respective solenoids 340 of valve 336 through lines 532 and 534. Thus, actuation of either switch, 520 or 530, in either of the two positions, will shift the front or rear ends of the spreader with respect to beams 46 by supplying hydraulic fluid to the appropriate ends of cylinders 54 and 56.

The self-centering circuit means incorporates a manually depressable switch 540 which is normally biased to an open position and has the first set of contacts 542 in line 544 and a second set of contacts 546 in line 548. Line 544 is connected to a pair of limit switches 550 and 552 that are interposed between the rear end of the spreader and the rear transverse beam 46. As illustrated in FIG. 7, limit switches 550 and 552 are connected to spreader 40 and have their actuators aligned with inclined camming surfaces or ramps 554 defined on member 556 located on beam 46. The member 556 is configured and positioned so that both limit switches 550 and 552 are open when the rear end of the spreader 40 is centered with respect to rear beam 46. If, however, the spreader is shifted to one side or the other from the centered position, one of these switches, 550 or 552 will be closed to energize either relay R6 or relay R7.

Switch 550 is connected to relay R6 which has a first set of normally opened contacts R6-1 located in parallel with switch contact 542. Likewise, switch 522 is connected to relay R7, that has a set of normally opened contacts R7-1 in parallel with switch contacts 542. Relay R6 has a second set of contacts R6-2 between line 522 and power source 410 while relay R7 has a second set of normally open contacts R7-2, located between source 410 and line 524.

Line 548 is also connected to a pair of normally open limit switches 560 and 562, that are interposed between the front beam 46 and the forward end of the spreader. Normally opened switch 560 is connected to relay R8 while normally opened switch 562 is connected to relay R9. Realy R8 has a first set of normally open contacts R8-1 in parallel with switch contacts 546 in line 548 while relay R9 also has a set of normally open contacts R9-1 in parallel with contacts 546. Relay R8 has a second set of normally open contacts R8-2, between source 410 and line 532, while relay R9 has a second set of normally open contacts R9-2 between source 410 and line 432.

With the above circuit, the spreader can automatically be returned into a center position by temporarily depressing switch 540 to close contacts 542 and 546. If for example, the spreader is to the left of a centered position with respect to rear beam 46 and the forward end of the spreader is to the right of the centered position with respect to the forward beam, limit switch 552 will be closed to energize relay R7 and close contacts R7-1 and R7-2. Closing of contacts R7-1 will maintain the circuit to relay R7 so that spring biased switch 540 can be released while contacts R7-2 will complete the circuit to an appropriate solenoid 328 which will energize valve 324 causing a shifting of the rear end of the spreader to the right. When the rear end of the spreader is in the centered position, limit switches 550 and 552 will be opened and valve 324 will be moved to the centered neutral position by spring 326. Likewise, having the forward end of spreader to the right of the centered position, will close limit switch 560 to complete the circuit to relay R8 and close normally open relay contacts R8-1 and R8-2, to energize one of the solenoids 340 and move the forward end of the spreader to the left until it reaches the centered position whereupon both switches 560 and 562 will be opened.

The centering mechanism can readily be actuated by momentarily actuating switch 540 and the switch can then be released so that the operator can attend to other operations while the spreader is being centered.

Hoisting Control Circuit

The control circuit for supplying current to the hoisting control valves is designed to prevent the hoisting fluid valves from being actuated unless all probes are in the proper position with respect to a conatiner and the latches which connect the container to the spreader are in either a fully latched or fully unlatched position. This is accomplished by electrical circuitry that is shown in FIG. 10.

The circuit for supplying current to either of the solenoids 316, consists of a two-position switch 570 which has two lines 572 and 574 connected to the respective solenoids 316. The solenoids are connected to ground through four normally open limit switches 576, that are associated with the respective latches 87 that are located in the respective corners of the spreader. Each of the normally open switches 576, has a probe 578 which will close the associated switch when the latch mechanism is in an appropriate position with respect to the container. When all four switches 576 are closed, the respective solenoids 316 are grounded and the latches can either be latched or unlatched by movement of switch 570. Switches 576 also have the second set of contacts that are respectively located in series with a line 580 that leads to a light 582 which will indicate when all of the latches are in the appropriate position.

The circuit also includes a first circuit for indicating that the respective latches are in a fully latched position and a second circuit for indicating that the latches are in a fully unlatched condition. The first circuit consists of a line 584 leading from line 580 and having two normally open switches 586 and 588 located therein. Switch 586 is associated with the rear end of the spreader and switch 588 is associated with the front end of the spreader. The two switches are closed by the respective linkages that are interposed between the latching fluid ram and the respective latches to indicate that the latches are actually in the fully latched condition. When both limit switches 586 and 588 are closed, a circuit is completed to relay R4 which closes normally opened contacts R4-1, located between power source 410 and controller 412, described in connection with FIG. 9. Again an indication light 589 may be located in line 584 to give the operator an indication when the latches are fully latched.

The unlatched indicator circuit is identical to the latched circuit and includes a line 590 having a pair of normally open limit switches 591 and 592 located therein which are again respectively associated with the front and rear ends of the spreader to indicate when the front and rear latches are in the fully unlatched position. When the two limit switches are closed, relay R5 is energized to close relay contacts R5-1 that are between power source 410 and controller 412. An indicator light 594 may be located in parallel with relay R5 to give the operator an indication when the latches are in a fully unlatched condition.

SUMMARY OF THE INVENTION

As can be seen from the above description, the present invention provides an extremely versatile straddle carrier which is capable of being operated at speeds of up to 20 MPH in either direction and can be driven in a circle that has a radius of approximately 30 feet. The unit is capable of being operated at infinitely variable speeds between 0 and 20 MPH and can stack three containers on top of each other. The carrier is particularly adapted for use in loading and unloading ships at docks.

The use of two engines on the respective sides of the vehicle considerably reduces the amount of conduit that is necessary for connecting all of the various pressurized fluid sources to the rams or motors. In fact, there is no necessity of having any conduits cross over from one side or leg of the vehicle to the other side or leg. By locating the respective engines in close proximity to the wheels, not only is the weight distribution close to the ground, but it reduces the amount of conduits that are needed between the large variable displacement pumps and the respective pairs of drive motors. Since virtually all of the controls are electrically operated, there is no necessity for having any hydraulic hoses located in the cab of the vehicle. The only hoses that must be in close proximity to the cab, but not inside the cab, are the two hoses that lead to and from the power steering valve. This arrangement is highly desirable since it reduces the noise and heat in the cab and also reduces the liability should any of the hoses rupture.

We claim:

1. A vehicle having an inverted U-shaped frame defining an elongated container carrying bay between first and second legs with each leg of said U-shaped vehicle having a plurality of ground engaging wheels; first and second engines respectively supported on respective legs of said vehicle; first drive means between said first engine and at least one wheel on said first leg; second drive means between said second engine and at least one wheel on said second leg; a reservoir; first and second pairs of pumps connected to said reservoir and respectively driven by said first and second engines; a hydraulic power steering system for turning said wheels with one of said first pair of pumps supplying fluid thereto; first and second longitudinally spaced transversely extending beams each having opposite ends respectively guided for vertical movement in said bay; a spreader having opposite ends respectively supported on said beams; first and second spreader fluid rams respectively interposed between said beams and respective ends of said spreader; spreader circuit means for supplying hydraulic fluid to said spreader fluid rams with one of said second pair of pumps supplying hydraulic fluid thereto, said spreader circuit means including centering means for automatically centering said spreader between said legs in response to actuation thereof; hoisting fluid ram means supporting said spreader for vertical movement in said bay; said hoisting fluid ram means including first and second cylinder and piston rod assemblies located on respective legs and respectively connected to respective ends of said spreader; hoisting circuit means for supplying hydraulic fluid to opposite ends of said cylinders, said hoisting circuit means including first and second pairs of conduits respectively connected to first and second ends of respective cylinders with first and second control valve means respectively in the respective pairs of conduits, said reservoir being connected to both of said valve means and the other of said pairs of pumps respectively connected to the respective control valve means; a pressure responsive valve means in each of said first conduits normally preventing flow therethrough, each pressure responsive valve means being connected to an associated second conduit to open in response to pressurized fluid in the second conduit and a normally closed valve means between the first end of each cylinder and each pressure responsive valve means and being operable to connect the first end of an associated cylinder to the pressure responsive valve means so that the pressure responsive valve means is opened in response to pressurized fluid in said first end of an associated cylinder; each of said piston rods having a first pulley rotatable thereon and first and second operative connections between opposite ends of said spreader and the respective first pulleys; each connection including three elongated flexible members extending parallel to each other with one end connected to said frame and being entrained over a first pulley, a second pulley adjacent an upper corner of said U-shaped frame with an intermediate flexible member entrained over said second pulley, and a third pulley adjacent an opposite upper corner of said U-shaped frame with both outer flexible members entrained over the third pulley and connected to an adjacent corner of said spreader; attitude control means forming part of said hoisting circuit means for limiting the angular attitude of said spreader with respect to a reference plane; and interconnection means for selectively connecting said power steering system and said spreader fluid rams to one pump of a pair of pumps and both of said hoisting fluid rams to another pump of a pair of pumps when one engine fails.

2. A vehicle having an inverted U-shaped frame defining an elongated container carrying bay between first and second vertical legs with each leg of said U-shaped vehicle having a plurality of ground engaging wheels; propulsion means on one of said legs and connected to at least some of said wheels for propelling said vehicle; a spreader supported for vertical movement in said bay; first and second means respectively having opposite ends supported for vertical movement on the respective legs with said spreader supported for horizontal movement on said beams; hoist means for raising and lowering said spreaders in said bay, said hoisting means including first and second hoisting fluid rams respectively supported on the respective legs, each of said hoisting fluid rams including a first element connected to an associated leg and a second element extensible and retractable with respect to said first element with a pulley rotatably supported on the free end of said second element, said hoisting means including first and second sets of flexible members respectively cooperating with said first and second hoisting fluid rams and opposite ends of said spreader, each set of flexible members including three parallel flexible members having one end connected to said leg and entrained over an associated pulley, with a center flexible member connected to one corner of said spreader and the outer two flexible members connected to an opposite corner of said spreader; first and second spreader fluid rams respectively interposed between said first and second beams and respective ends of said spreader; hydraulic circuit means for supplying hydraulic fluid to all of said rams and including a reservoir and a pressurized fluid source; a hoisting fluid circuit including first and second electrically operated valve means each connected to said reservoir and said pressurized fluid source and respectively connected to said first and second hoisting fluid rams, electric circuit means connected to a power source and to said first and second hoisting valve means, control means forming part of said electric circuit means for selectively effecting actuation of said first and second hoisting valve means, said control means including attitude control means for limiting the angular attitude of said spreader to a selected maximum with respect to a horizontal reference plane and operated in response to said spreader assuming said selected maximum attitude; spreader circuit means in said hydraulic circuit means for supplying hydraulic fluid to said first and second spreader fluid rams, said spreader circuit means including means for automatically centering said spreader between said legs in response to actuation thereof.

* * * * *